(12) United States Patent
Honkanen et al.

(10) Patent No.: US 10,845,469 B2
(45) Date of Patent: Nov. 24, 2020

(54) LASER SCANNING DEVICES AND METHODS FOR EXTENDED RANGE DEPTH MAPPING

(71) Applicant: Microvision, Inc., Redmond, WA (US)

(72) Inventors: Jari Honkanen, Monroe, WA (US); Robert James Jackson, Monroe, WA (US)

(73) Assignee: Microvision, Inc., Redmond, WA (US)

( * ) Notice: Subject to any disclaimer, the term of this patent is extended or adjusted under 35 U.S.C. 154(b) by 409 days.

(21) Appl. No.: 15/865,024

(22) Filed: Jan. 8, 2018

(65) Prior Publication Data

US 2019/0212421 A1 Jul. 11, 2019

(51) Int. Cl.
| | |
|---|---|
| *G01S 7/48* | (2006.01) |
| *G01S 7/4865* | (2020.01) |
| *G01S 17/42* | (2006.01) |
| *G01S 7/481* | (2006.01) |
| *G01S 17/89* | (2020.01) |
| *G01S 17/10* | (2020.01) |
| *G01S 7/4861* | (2020.01) |
| *G01S 7/486* | (2020.01) |

(52) U.S. Cl.
CPC .......... *G01S 7/4865* (2013.01); *G01S 7/4816* (2013.01); *G01S 7/4817* (2013.01); *G01S 7/4861* (2013.01); *G01S 7/4868* (2013.01); *G01S 17/10* (2013.01); *G01S 17/42* (2013.01); *G01S 17/89* (2013.01)

(58) Field of Classification Search
CPC ............ B60W 10/04; B60W 30/18145; G06K 9/00791; G06K 9/42; G01S 7/4808; G01S 13/931; G01S 13/42; G01S 13/89; G01S 7/4972; G01S 7/40; G01S 13/865; G01S 17/66; G06N 3/08; G05D 1/0221; G05D 1/0248; G06T 17/20; G06T 15/08
See application file for complete search history.

(56) References Cited

U.S. PATENT DOCUMENTS

| | | | |
|---|---|---|---|
| 2017/0372602 A1* | 12/2017 | Gilliland | ................ G01S 17/66 |
| 2019/0180502 A1* | 6/2019 | England | ................ B60W 10/04 |

* cited by examiner

*Primary Examiner* — Luke D Ratcliffe
(74) *Attorney, Agent, or Firm* — Kevin D. Wills

(57) ABSTRACT

Devices and methods are described that provide for scanning surfaces and generating 3-dimensional point clouds that describe the depth of the measured surface at each point. In general, the devices and methods utilize. Specifically, the depth mapping devices and methods utilize multiple receiver channels, with each receiver channel configured to have a different effective sensing range. These multiple receiver channels together provide the depth mapping device with an increased overall effective sensing range. Thus, the depth mapping device can effectively map surfaces that are closer and/or farther than could be mapped using only one receiver channel.

11 Claims, 7 Drawing Sheets

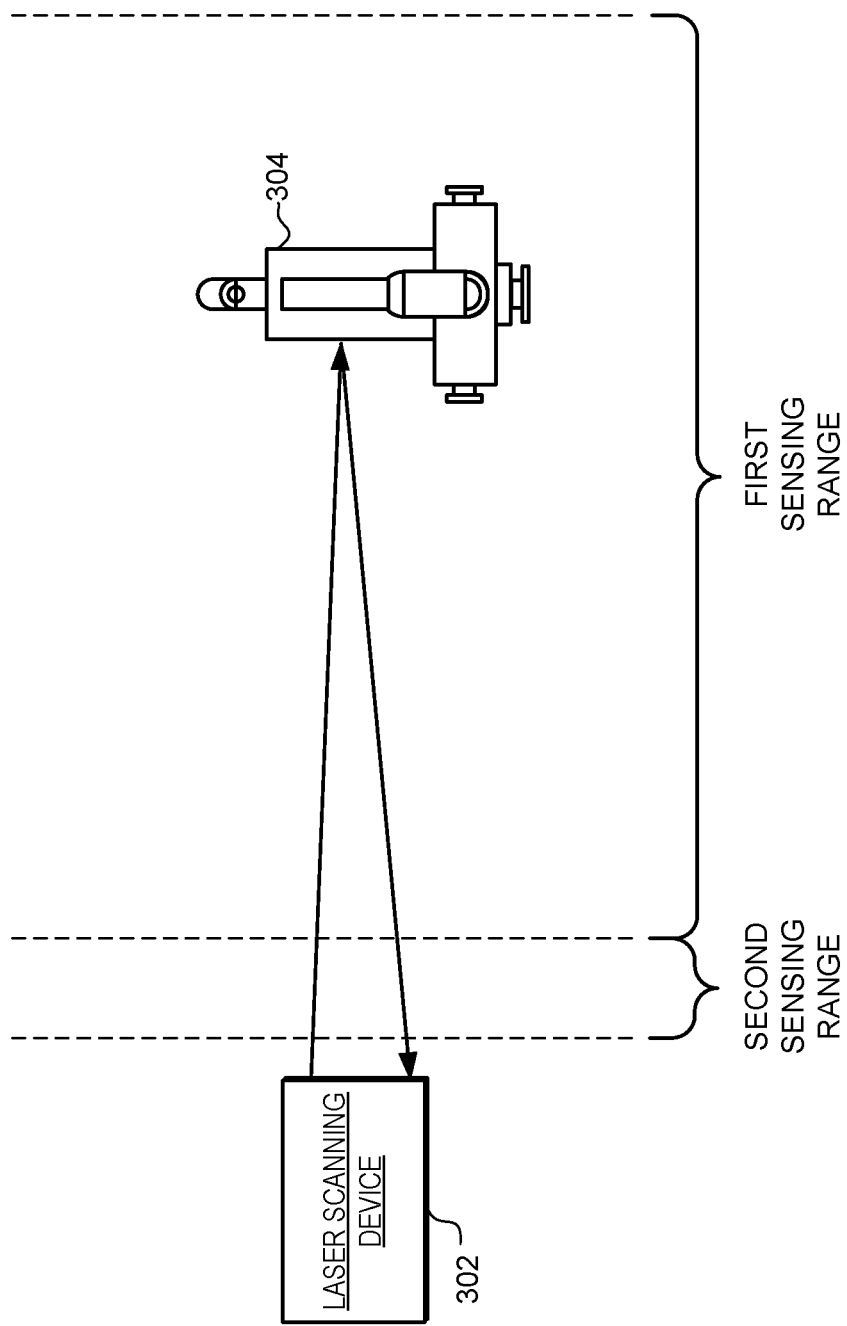

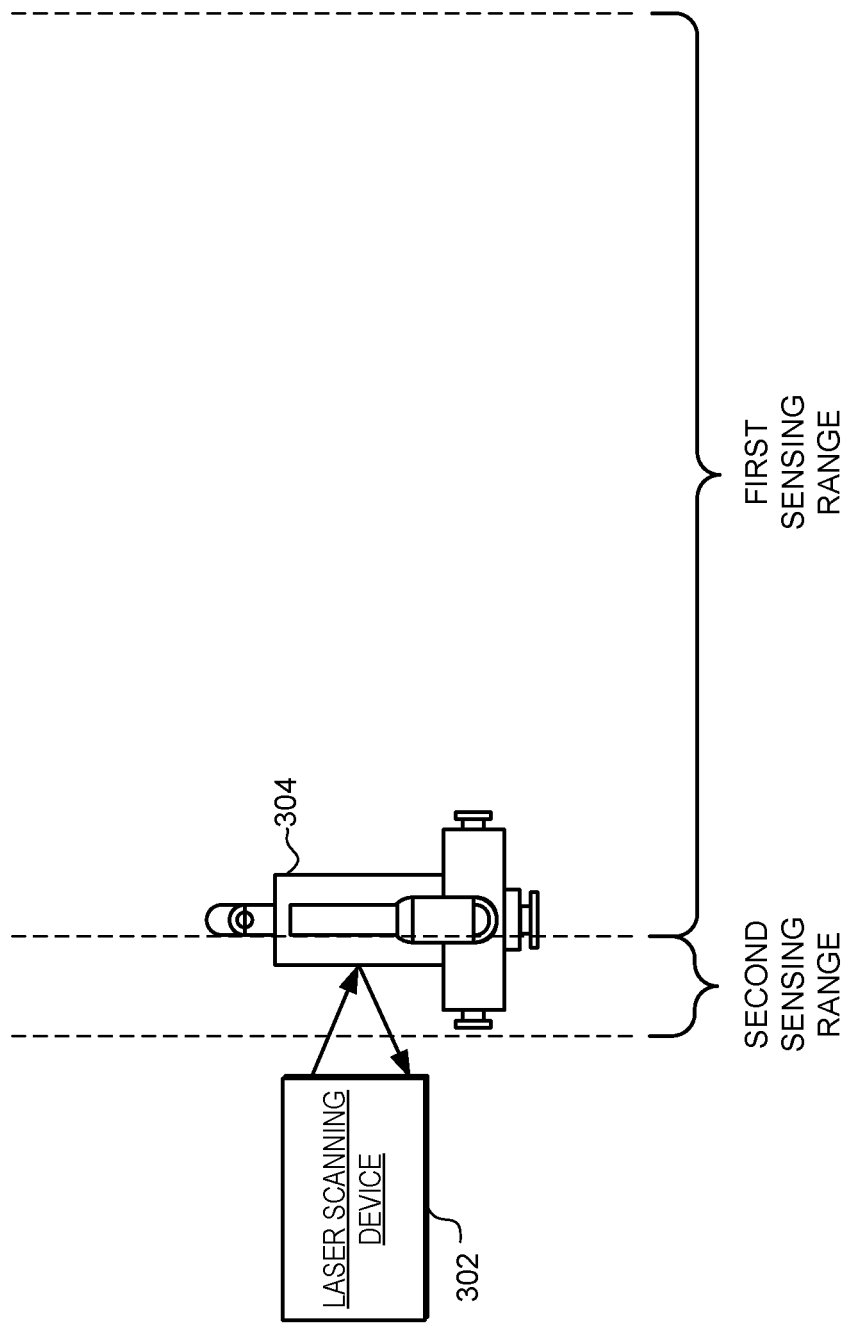

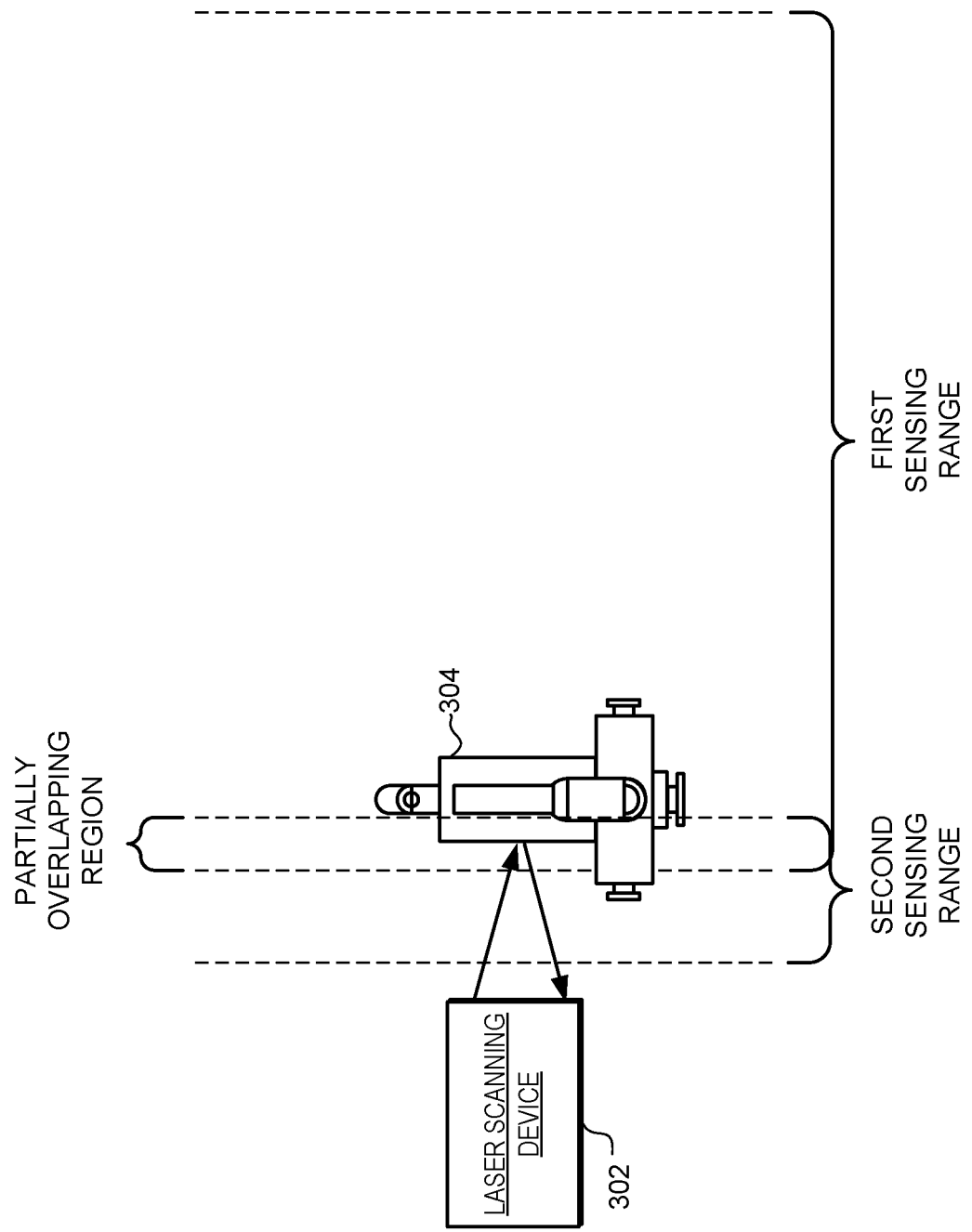

LASER SCANNING DEVICES AND METHODS FOR EXTENDED RANGE DEPTH MAPPING

FIELD

The present disclosure generally relates to depth mapping, and more particularly relates to depth mapping with scanning lasers.

BACKGROUND

Depth mapping devices have been developed to generate 3D maps of surfaces, where the 3D maps describe the variations in depth over the surface. Such depth mapping devices are used in a variety of applications, including object and motion sensing, navigation and control. For example, such depth mapping devices are being used in the navigation and control of autonomous vehicles, including autonomous devices used for transportation and manufacturing.

One limitation in some typical depth mapping devices is a lack of operational flexibility. For example, typical depth mapping devices may be limited to accurately sensing objects over a relatively narrower effective distance range.

For example, some depth mapping devices may be configured to accurately sense over an effective distance range that is relatively far from the sensor. Specifically, technical limitations in such a depth mapping device can cause these devices to have very limited ability to accurately sense relatively close objects. For example, in such a device objects that are too close can swamp the device, resulting in noisy and inaccurate measurements. Conversely, some depth mapping devices may be configured to accurately sense relatively close to the sensor. Again, the technical limitations of such a depth mapping device can result in a very limited ability to accurately sense relatively far objects. In such a device objects that are too far may only be intermittently sensed or may not be sensed at all.

In both cases the effective distance range of the depth mapping device is limited, and such a limitation can significantly reduce the functionality and usability of the device. For example, such a limited effective range can reduce the ability of autonomous vehicles to safely navigate and perform other operations.

As such, there remains a need for improved devices and methods for depth mapping, and in particular a need for depth mapping with improved effective distance ranges.

BRIEF DESCRIPTION OF THE DRAWINGS

FIGS. 3A, 3B, and 3C are graphical representations of laser scanning device with a first sensing range and second sensing range in accordance with various embodiments of the present invention;

DESCRIPTION OF EMBODIMENTS

The embodiments described herein provide depth mapping devices and methods with increased effective sensing ranges. Specifically, the depth mapping devices and methods utilize multiple receiver channels, with each receiver channel configured to have a different effective sensing range. These multiple receiver channels together provide the depth mapping device with an increased overall effective sensing range. Thus, the depth mapping device can effectively map surfaces that are closer and/or farther than could be mapped using only one receiver channel.

The depth mapping devices and methods use the multiple receiver channels to generate 3-dimensional point clouds that describe the depth of the measured surface at each point. In general, the devices and methods utilize scanning mirror(s) that reflect a laser beam into a pattern of scan lines. When the raster pattern of scan lines is directed at a surface, reflections of the laser beam from the surface are received at sensors in the multiple receiver channels and used to the generate 3-dimensional point clouds that describe the measured surface depth at each point (e.g., provide a depth map of the surface).

Figure 1:
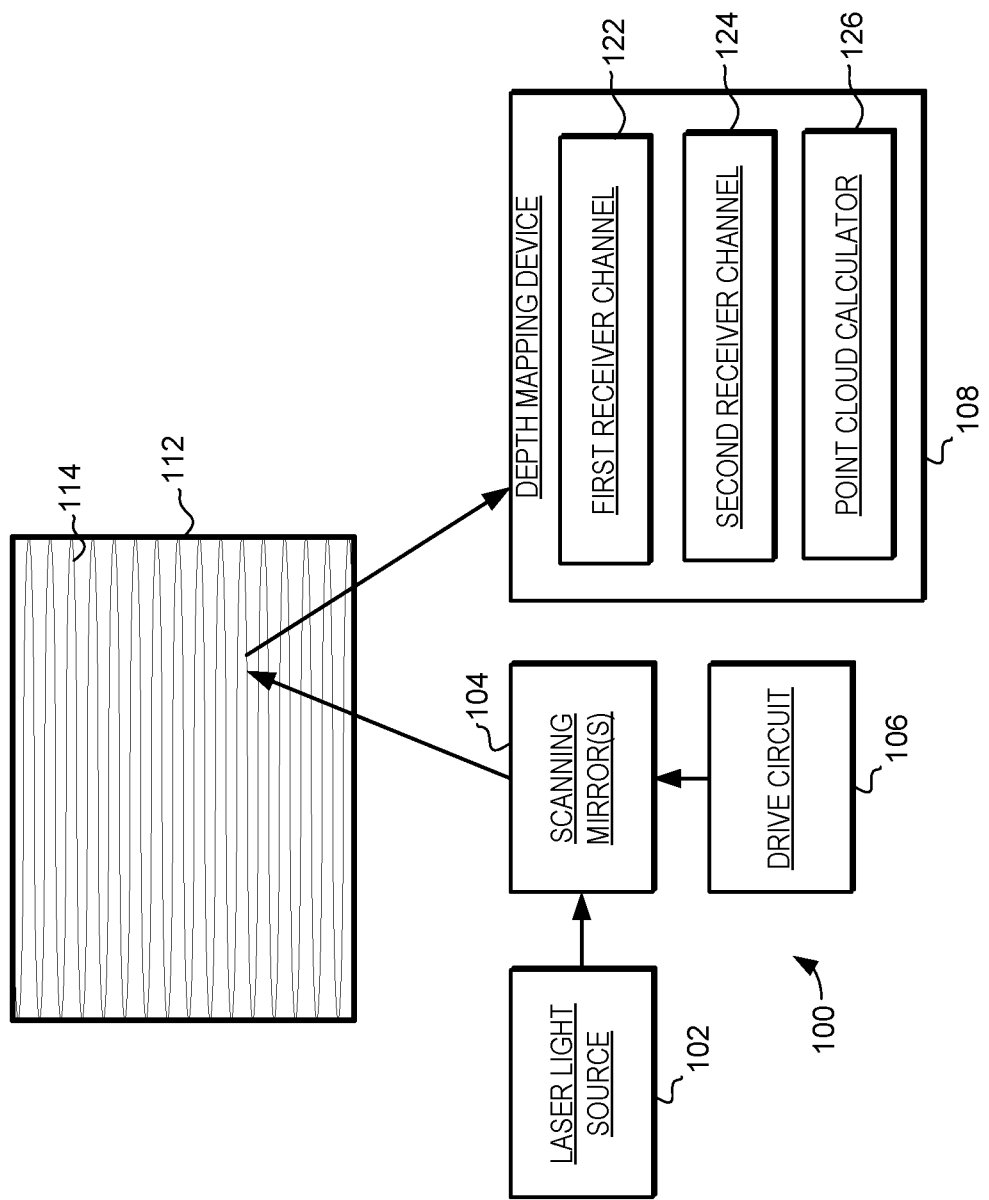
FIG. 1 shows a schematic diagram of a laser scanning device in accordance with various embodiments of the present invention.

Turning now to FIG. 1, a schematic diagram of a laser depth scanning device 100 is illustrated. The laser depth scanning device 100 includes a laser light source 102, scanning mirror(s) 104, a drive circuit 106, and a depth mapping device 108. During operation, the laser light source 102 generates a beam of laser light that is reflected by the scanning mirror(s) 104 into a pattern 114 of scan lines inside a scanning region 112. As one example, the laser light source 102 can comprise an infrared laser.

In the example of FIG. 1, the pattern 114 of scan lines comprises a raster pattern. However, this is just one example, and in other embodiments other patterns of scan lines can be generated as used. For example, spiral patterns and Lissajous patterns could instead be used. To facilitate the generation of the pattern 114, the drive circuit 106 controls the movement of the scanning mirror(s) 104. Specifically, the drive circuit 106 provides excitation signal(s) to excite motion of the scanning mirror(s) 104 in a way that results in the generation of the pattern 114 of scan lines.

In accordance with the embodiments described herein, the depth mapping device 108 includes a first receiver channel 122, a second receiver channel 124, and a point cloud calculator 126. In general, the first receiver channel 122 is configured to receive first reflections of the laser beam from a surface within the scanning region 112 and generate first timing data from the received first reflections. Likewise, the second receiver channel 124 is configured to receive second reflections of the laser beam from the surface and generate second timing data from the received second reflections. The point cloud calculator 126 is calculator configured to receive the first timing data and the second timing data and generate a 3-dimensional point cloud of the surface based at least in part on the first timing data and the second timing data.

For example, the laser light source 102 can be configured to generate pulses in the laser beam. The reflection of those pulses is received by the first receiver channel 122 and the second receiver channel 124. The first receiver channel 122 provides first timing data to the point cloud calculator 126, while the second receiver channel 122 provides second timing data to the point cloud calculator 126. From this timing data, the point cloud calculator 126 calculates a time of flight for the return of each received pulse. The generated times of flight for the received pulses are used by point cloud calculator 126 to generate the 3-dimensional point cloud of the surface.

In accordance with the embodiments described herein, the first receiver channel 122 and the second receiver channel 124 are configured to have different effective sensing ranges. Stated another way, the first receiver channel 122 and the second receiver channel 124 are configured to have different sensitives to the reflected laser light. Specifically, the first receiver channel 122 and the second receiver channel 124 are configured to have different dynamic ranges, where the dynamic range of each channel is defined as the ratio of maximum to minimum signal amplitudes that can be accurately received and processed by the channel. Thus, in one embodiment, the first receiver channel 122 is configured to receive a dynamic range of signal amplitudes that correspond to relatively far object sensing. Conversely, the second receiver channel 122 is configured to receive a dynamic range of signal amplitudes that correspond to relatively close object sensing. As will be described below, in one embodiment these different dynamic ranges can be facilitated by using sensors with different responsivities and/or amplifiers with different gains.

Thus, the first receiver channel 122 and the second receiver channel 124 together can provide an overall larger effective sensing range. In one embodiment the first receiver channel 122 is configured to cover a relatively far effective sensing range, while the second receiver channel 124 is configured to cover a relatively close effective sensing range. In such an embodiment the relatively far effective sensing range provided by the first receiver channel 122 can be partially overlapping with the relatively close effective sensing range provided by the second receiver channel 124. This partial overlap ensures that all surfaces within the combined sensing ranges can be effectively mapped.

In one embodiment, the point cloud calculator 126 is configured to generate the 3-dimensional point cloud of the surface based on the first timing data received from the first receiver channel 122 when the surface is in the first effective sensing range. Likewise, the point cloud calculator 126 can be configured to generate the 3-dimensional point cloud of the surface based on the second timing data when the surface is in the second effective sensing range. Thus, the timing data used to generate the 3-dimensional point cloud of the surface depends on the distance to the surface, and thus more accurate timing data can be used in each instance to generate the 3-dimensional point cloud of the surface.

Again, in such embodiments the effective sensing range provided by the first receiver channel 122 can be partially overlapping with the effective sensing range provided by the second receiver channel 124. In such an embodiment, the point cloud calculator 126 can be configured to generate the 3-dimensional point cloud of the surface based on both the first timing data and the second timing data when the surface is in the partially overlapping region. For example, the point cloud calculator 126 can be configured to generate the 3-dimensional point cloud of the surface based on both the first timing data and the second timing data by using a weighted average of the first timing data and the second timing data. Conversely, the point cloud calculator 126 can be configured to generate the 3-dimensional point cloud of the surface based on both the first timing data and the second timing data by selecting from the first timing data and the second timing data based on signal amplitude levels in the first receiver channel and the second receiver channel.

In one embodiment each of the first receiver channel and second receiver channel includes an optical sensor. In such an embodiment, a first optical sensor can have a first responsivity greater than a second responsivity of the second optical sensor, and can this difference in responsivity can facilitate the difference in effective sensing ranges. For example, the first optical sensor can be implemented with an avalanche photodiode (APD) or a silicon photo multiplier (SiPM), while the second optical sensor is implemented with a standard photodiode having a lower responsivity. For example, the second optical sensor can be implemented with a silicon, germanium or other photodiode. As one specific example, the second optical sensor can be implemented with a PIN photodiode.

In another embodiment each of the first receiver channel and second receiver channel includes an amplifier. In such an embodiment the first amplifier of the first receiver channel can have a higher gain compared to the second amplifier of the second receiver channel. This difference in gain can again facilitate the difference in effective sensing ranges.

As noted above, in one embodiment the first receiver channel 122 is configured to cover a relatively far effective sensing range, while the second receiver channel 124 is configured to cover a relatively close effective sensing range. As one example, the first effective sensing range can include distances between 0.1 to 1.5 meters and the second effective sensing range can include distances from 1.0 to 20.0 meters. However, this is just one example.

In some embodiments the depth mapping device 108 can include additional receiver channels. For example, the depth mapping device 108 can include a third receiver channel, where the third receiver channel is configured to receive third reflections of the laser beam from the surface and generate third timing data from the received third reflections. This third timing data can then be used with the other timing data to generate the 3-dimensional point cloud of the surface. This third receiver channel can be configured to have a third effective sensing range different from the first effective sensing range and the second effective sensing range. Thus, the third receiver channel can facilitate additional sensing extended sensing range.

Figure 2:
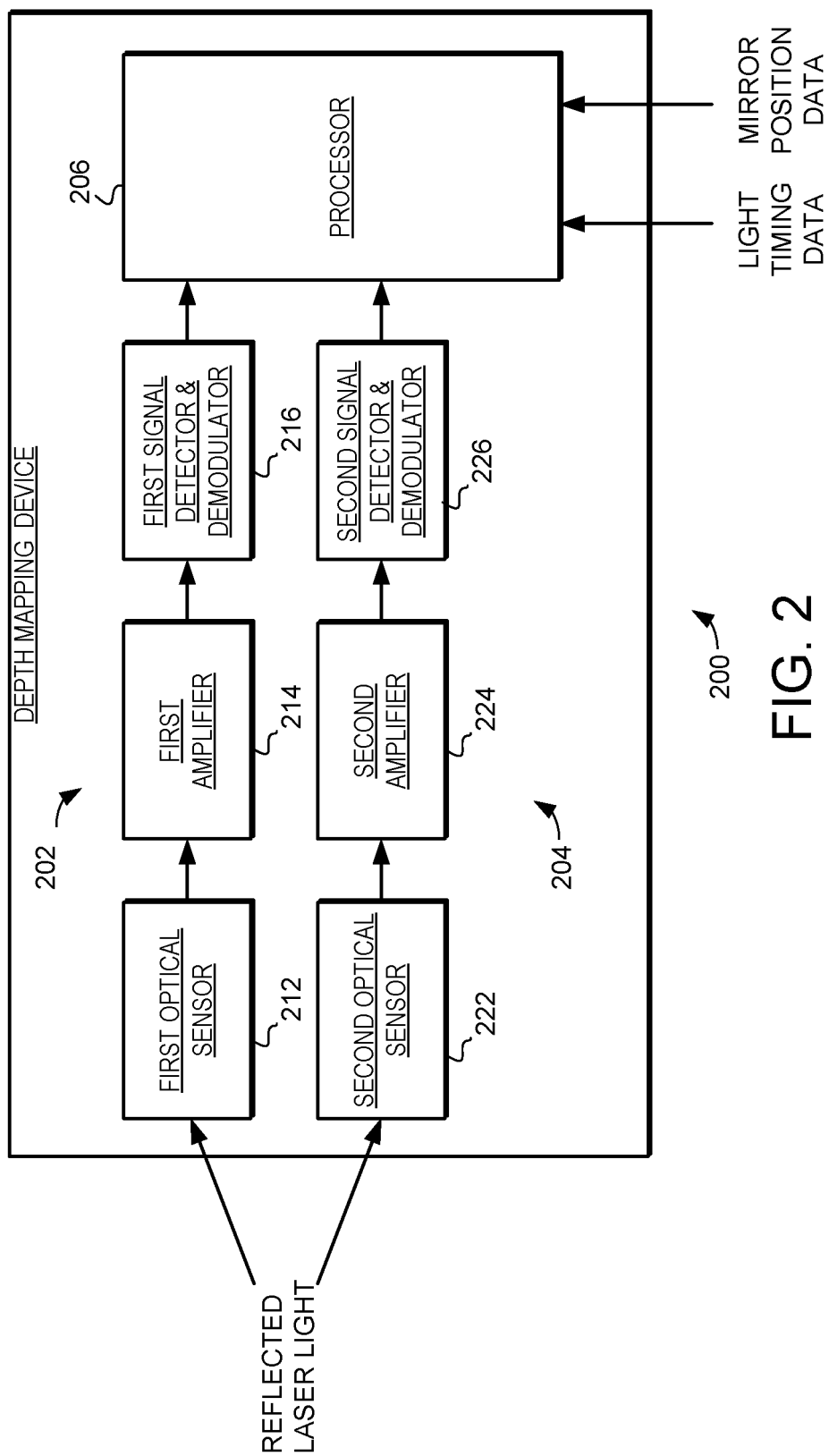
FIG. 2. shows a schematic view of a depth mapping device in accordance with various embodiments of the present invention.

Turning now to FIG. 2, a more detailed embodiment of a depth mapping device 200 is illustrated. In FIG. 2, the depth mapping device 200 includes a first receiver channel 202, a second receiver channel 204, and a processor 206. In general, the first receiver channel 202 and second receiver channel 204 are each configured to receive laser light reflected from a surface and generate timing data based on the received laser light reflections. That timing data is then passed to the processor 206. The processor 206 implements the point cloud calculator and generates 3-dimensional point clouds of surfaces based at least in part on the first timing data and the second timing data.

In this illustrated embodiment, the first receiver channel 202 includes a first optical sensor 212, a first amplifier 214, and a first signal detector and demodulator 216. Likewise, the second receiver channel 204 includes a second optical sensor 222, a second amplifier 224, and a second signal detector and demodulator 226. In general, the optical sensors 212 and 222 receive the reflected pulses of light and generate an output signal that is proportional to the received light. Those output signals are amplified by the amplifiers 214 and 224, and passed to the signal detectors and demodulators 216 and 226. The signal detectors and demodulators 216 and 226 generate timing data from the amplified output signals, and that timing data is passed to the processor 206. This timing data can include a time signal proportional to the time of flight of each received pulse and an amplitude signal proportional to the received signal amplitude.

The processor 206 also receives light timing data from the light source (e.g., laser light source 102). This light timing data describes the timing of the depth mapping pulses projected on to the surface. Likewise, the processor 206 receives mirror position data from the drive circuit (e.g., drive circuit 106). The mirror position data describes the position of the mirror as it relates to each depth mapping pulse. In some embodiments those signals can be filtered, synthesized or otherwise processed prior to sending to the processor 206, while in other embodiments those signals can be processed by the processor 206.

The processor 206 then generates 3-dimensional point clouds based on the time of flight and amplitude of the received pulses, the light timing data and the mirror position data.

Specifically, the time of flight for each pulse to travel from the light source to the surface, and back to the optical sensor can be determined at least in part by light timing data and the amplitude signals from the signal detectors and demodulators 216 and 226. The location on the surface corresponding to each pulse can be determined at least in part from the mirror position data. Because the time of flight of each pulse is proportional to the distance to the surface at that point, the time of flight can be used to calculate the surface depth at that point of reflection. And when a composite of the determined surface depths from each point in the raster pattern scan is made, the resulting content can provide a 3-dimensional point cloud describing the surface depth of the scanned surface.

To facilitate this, the processor 206 can be implemented with any suitable type of processing system or device. For example, the processor 206 can be implemented with software implemented programs that are loaded into memory and executed on hardware, where the hardware utilizes integrated circuits designed to execute such programs. In other embodiments, the processor 206 can be implemented exclusively in hardware or in combinations of hardware and software. For example, the processor 206 can be implemented to include application-specific integrated circuits (ASICs) designed for this specific application, or general purpose central processing units (CPUs) that commonly provide processing functionality on computing devices. Furthermore, system on chip (SoC) processors can integrate a variety of system components into a single integrated device, and may include digital, analog, optical, and other functions on a single semiconductor substrate.

In accordance with the embodiments described herein, the first receiver channel 202 and the second receiver channel 204 are configured to have different effective sensing ranges. Thus, the first receiver channel 202 and the second receiver channel 204 together can provide an overall larger effective sensing range for the depth mapping device 200. In one embodiment the first receiver channel 202 is configured to cover a relatively far effective sensing range, while the second receiver channel 204 is configured to cover a relatively close effective sensing range. In such an embodiment the relatively far effective sensing range provided by the first receiver channel 202 can be partially overlapping with the relatively close effective sensing range provided by the second receiver channel 204. This partial overlap ensures that all surfaces within the combined sensing ranges can be effectively mapped.

To facilitate this, the first optical sensor 212, the first amplifier 214, and first signal detector and demodulator 216 would be selected and implemented to provide for effective sensing in a first sensing range. Likewise, the second optical sensor 222, the second amplifier 224, and second signal detector and demodulator 226 would be selected and implemented to provide for effective sensing in a second sensing range different from the first sensing range. For example, these elements can be selected to provide different dynamic ranges for each of the channels 202 and 204, where the dynamic range of each channel is defined as the ratio of maximum to minimum signal amplitudes that can be accurately received and processed. Thus, the elements of first receiver channel 202 are configured to receive a dynamic range of signal amplitudes that corresponds to relatively far object sensing. Conversely, the elements in the second receiver channel 204 are configured to receive a dynamic range of signal amplitudes that corresponds to relatively close object sensing.

As one example, these elements can be selected to provide different total loop gains, with the different total loop gains used to facilitate different effective sensing ranges. As examples, such different total loop gains can be provided by selecting sensors with different responsivities and/or selecting amplifiers with different gains.

For example, the first optical sensor 212 can be implemented to have a greater responsivity than the second optical sensor 212, where the responsivity for a given wavelength $R(\lambda)$ is defined as:

$$R(\lambda) = \frac{I_{PD}}{P}$$

where $I_{PD}$ is the generated current and P is the incident light power at the wavelength ($\lambda$). As one example implementation, the first optical sensor 212 implemented with an avalanche photodiode (APD), a silicon photo multiplier (SiPM), or a photomultiplier tube. Each of the devices can be implemented to have a relatively high responsivity. Such relatively high responsivity can facilitate a high loop gain in the first receiver channel 202. As such, the high responsivity can facilitate a relatively far first effective sensing range. However, avalanche photodiodes and silicon photo multipliers do have a relatively high cost.

In such an embodiment, the second optical sensor 222 can be implemented with a standard photodiode having a lower responsivity. For example, the second optical sensor 222 can be implemented with a PIN photodiode. PIN photodiodes have a relatively low responsivity. Such relatively low responsivity can facilitate a relatively low loop gain in the second receiver channel 204. As such, the low responsivity can facilitate a relatively close second effective sensing range. Furthermore, PIN photodiodes have a relatively low cost.

In other embodiments, the gain of the amplifiers can be selected to provide different total loop gains in the first receiver channel 202 and the second receiver channel 204. Specifically, the first amplifier 214 can be implemented to have a higher gain compared to the second amplifier 224. Such differences in gain can be provided using any suitable configuration and implementation of the amplifiers. The higher gain of the first amplifier 212 can again provide a relatively far first effective sensing range, and the lower gain of the second amplifier 224 can again provide a relatively close second effective sensing range.

The depth mapping device 200 thus uses multiple receiver channels 202 and 204 to provide an increased effective sensing ranges. Specifically, the depth mapping device 200 can effectively map surfaces that are closer and/or farther than could be mapped using only one receiver channel.

Turning now to FIG. 3A, a schematic diagram 300 illustrating a laser scanning device 302 is illustrated. The diagram 300 shows the laser scanning device 302 generating a laser that is reflected off an object 304 and received back at the laser scanning device 302. As described above, the laser scanning device 302 is implemented to generate 3-dimensional point clouds that provide a depth mapping of surfaces on the object 304 based on the received reflections.

In accordance with the embodiments described herein, the laser scanning device 302 includes at least a first receiver channel and a second receiver channel. Each receiver channel is configured to receive reflections of the laser beam from the object 304 and generate timing data from the received reflections. The first receiver channel and the second receiver channel are configured to have different effective sensing ranges for a given surface reflectivity. In the example of FIG. 3A, the first receiver channel is designed and implemented to provide accurate mapping in a first sensing range for a given surface reflectivity. Likewise, the second receiver channel is designed and implemented to provide accurate mapping in a second sensing range for a given surface reflectivity. In this illustrated example, the first sensing range is relatively far from the laser scanning device 302, while the second sensing range is relatively close. Because the multiple receiver channels each covers different sensing ranges, the multiple receiver channels together can provide an overall larger effective sensing range for the laser scanning device 302. As one example, the first effective sensing range can include distances between 0.1 to 1.5 meters and the second effective sensing range can include distances from 1.0 to 20.0 meters.

In the example of FIG. 3A, the object 304 is within first sensing range. Thus, the laser scanning device 302 would use reflections received by the first receiver channel to generate 3-dimensional point clouds of the surfaces on the object 304. In such an embodiment the laser scanning device 302 could determine that the object 304 is within the first sensing range based on timing data or signal characteristics with the receiver channels. With such a determination made, the first timing data from the first receiver channel would be used to generate the 3-dimensional point clouds.

Turning now to FIG. 3B, a second schematic diagram 320 illustrating the laser scanning device 302 is illustrated. In the example of FIG. 3B, the object 304 is within the second sensing range. Thus, in this example the laser scanning device 302 would use reflections received by the second receiver channel to generate 3-dimensional point clouds of the surfaces on the object 304. Again, in such an embodiment the laser scanning device 302 could determine that the object 304 is within the second sensing range based on timing data or signal characteristics with the receiver channels. With such a determination made, the second timing data from the second receiver channel would be used to generate the 3-dimensional point clouds.

As was noted above, in some embodiments the first effective sensing range provided by the first receiver channel can be partially overlapping with the second effective sensing range provided by the second receiver channel. Turning now to FIG. 3C, a third schematic diagram 340 illustrating the laser scanning device 302 is illustrated. In the example of FIG. 3C, the first sensing range and the second sensing range are partially overlapping. Specifically, the first sensing range and the second sensing range have a partially overlapping region where either the first receiver channel or the second receiver channel could generate accurate timing data.

In the example of FIG. 3C, at least part of the object 304 is within the partially overlapping region. Thus, in this example the laser scanning device 302 could use reflections received by the first receiver channel, the second receiver channel, or both, to generate 3-dimensional point clouds of the surfaces on the object 304.

For example, the laser scanning device 302 can be configured to generate the 3-dimensional point clouds of object 304 based on weighted averages. As one specific example, each point in the 3-dimensional point cloud can be determined by independently calculating the time of flight from the timing data generated by each of the receiver channels and averaging the results. In alternative examples, the timing data from both receiver channels can first be averaged and then the average used to calculate the time of flight for each point in the 3-dimensional point cloud.

As other examples, the laser scanning device 302 can be configured to generate the 3-dimensional point cloud of the surface based on characteristics of signals in each of the receiver channels. As one specific example, timing data can be selected from the first receiver channel or second receiver channel based on the on return signal amplitude levels within the sensor or amplifier. In such an embodiment, the receiver channel having signal amplitudes above a first threshold and below a second threshold can be identified and used. Such a technique can be used to avoid the use of signals that are potentially too large and could potentially swamp the sensor or amplifier. Similarly, such a technique can be used to avoid the use of signals that are too small to be accurately quantified. By using the timing data selected from the first receiver channel or second receiver channel based on signal amplitude levels, the noise floor can be reduced and the signal-to-noise ratio (SNR) of the laser scanning device 302 can be improved.

Figure 4:
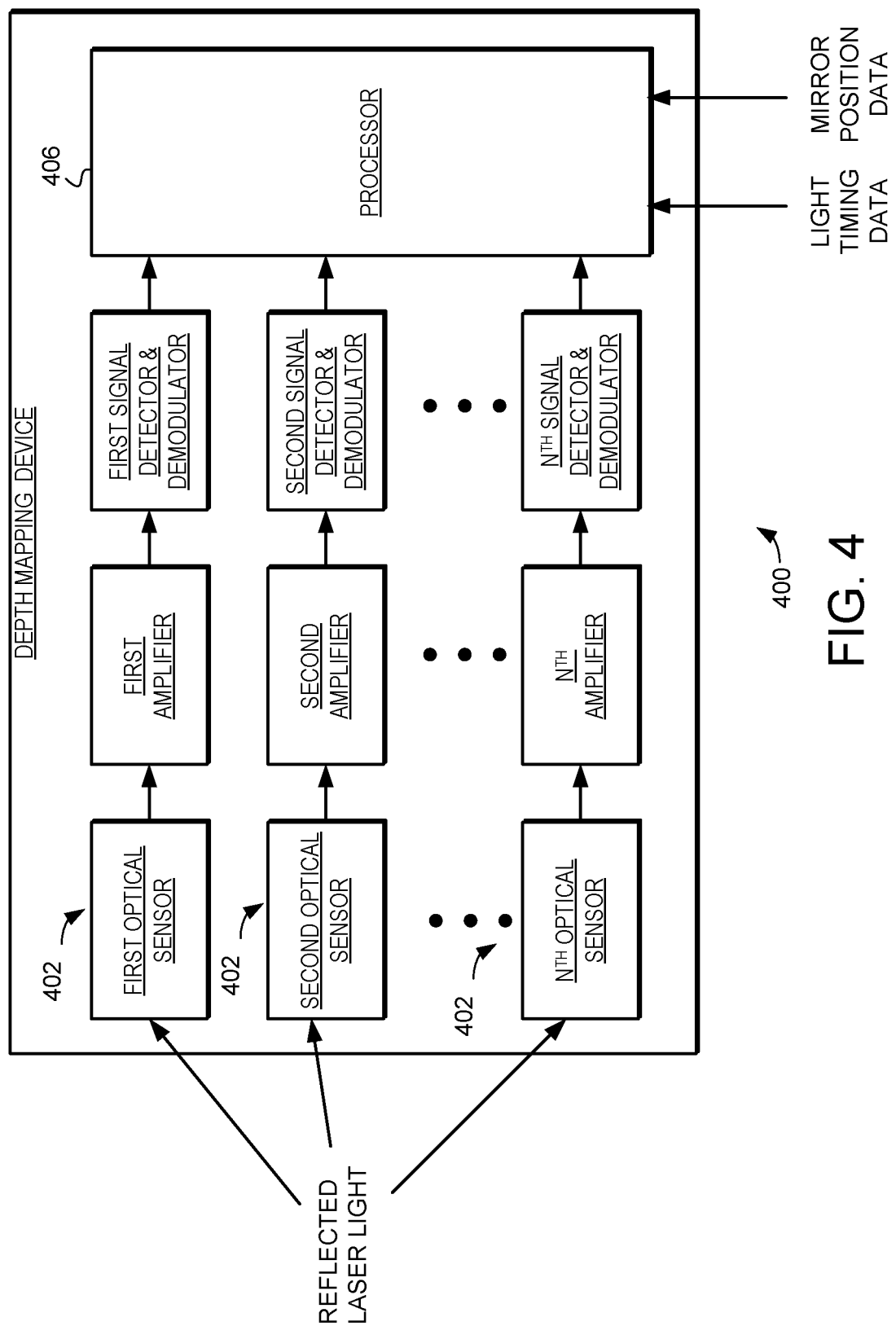
FIG. 4. shows a schematic view of a depth mapping device in accordance with other various embodiments of the present invention.

While the examples discussed above illustrate laser scanning devices with two receiver channels, it should be noted that in some embodiments greater numbers of receiver channels can be implemented. Turning now to FIG. 4, another embodiment of a depth mapping device 400 is illustrated. In FIG. 4, the depth mapping device 400 includes N receiver channels 402. Each receiver channel 402 is configured to receive laser light reflected from a surface and generate timing data based on the received laser light reflections. That timing data is then passed to the processor 406. The processor 406 implements the point cloud calculator and generates 3-dimensional point clouds of surfaces based at least in part on the first timing data and the second timing data.

In this illustrated embodiment each receiver channel 402 includes an optical sensor, amplifier, and signal detector and demodulator. Each of these receiver channels can be configured to have a different effective sensing range for a given surface reflectivity. Thus, the N receiver channels 402 together can provide an overall larger effective sensing range for the depth mapping device 400. In one embodiment the first receiver channel 302 is configured to cover a relatively far effective sensing range, the second receiver channel 402 is configured to cover an intermediate effective sensing range, while the third receiver channel 420 is configured to cover a relatively close effective sensing range. Of course, such an example can be expanded to include any number of receiver channels. Such a depth mapping device 400 thus uses multiple receiver channels 402 to provide an increased effective sensing range.

Figure 5:
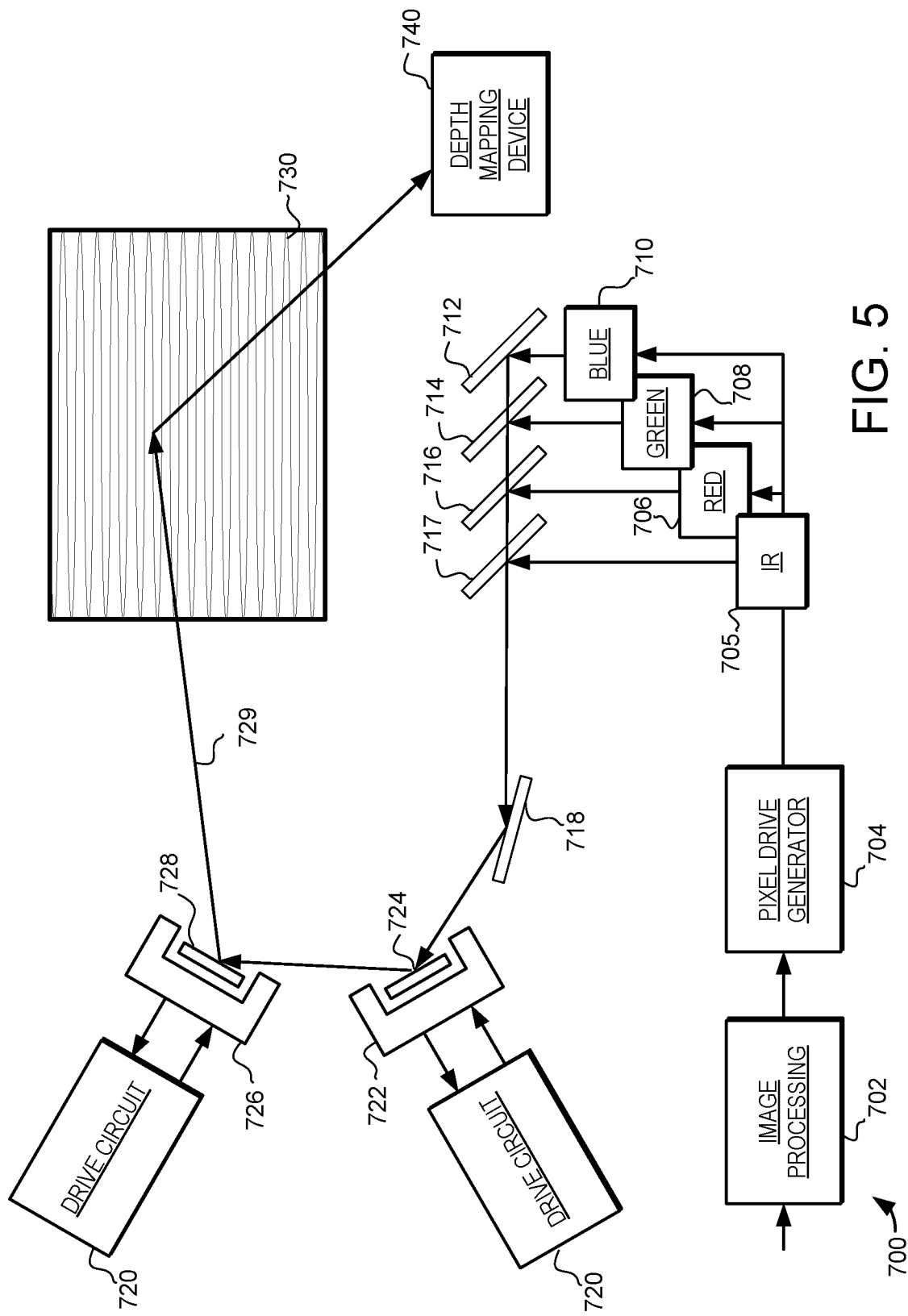
FIG. 5 shows a schematic view of a scanning laser projector in accordance with various embodiments of the present invention.

Turning now to FIG. 5, a schematic view of a scanning laser projector 700 is illustrated. The scanning laser projector 700 is a more detailed example of the type of laser scanning device that can be used in accordance with various embodiments of the present invention. Specifically, the scanning laser projector 700 can be implemented using the depth mapping devices described above.

Scanning laser projector 700 includes an image processing component 702, a pixel drive generator 704, an infrared laser module 705, a red laser module 706, a green laser module 708, and a blue laser module 710. In such an embodiment, the red, green and blue light can be used for image projection, while the infrared light can be used for depth scanning. Light from the laser modules is combined with dichroics 712, 714, 716, and 717. Scanning laser projector 700 also includes fold mirror 718, drive circuits 720, a first scanner assembly 722 with first scanning mirror 724, and second scanner assembly 726 with a second scanning mirror 728. It should be noted that this illustrated arrangement for combing the outputs from the various laser modules is just one example implementation, and other implementations using different techniques for combing laser light of different wavelengths can instead be used.

In operation, image processing component 702 processes video content using two dimensional interpolation algorithms to determine the appropriate spatial image content for each scan position at which an output pixel is to be displayed by the pixel drive generator 704. For example, the video content may represent a grid of pixels at any resolution (e.g., 640×480, 848×480, 1280×720, and 1920×1080). The input light intensity encoding typically represents the light intensity in 8, 10, 12 bit or higher resolutions.

This content is then mapped to a commanded current for each of the red, green, and blue laser sources such that the output intensity from the lasers is consistent with the input image content. In some embodiments, this process occurs at output pixel rates in excess of 150 MHz. The laser beams are then directed onto scanning mirrors 724 and 728. In general, the first scanning mirror 724 provides for one axis of motion (e.g., horizontal), while the second scanning mirror 728 provides for another axis of motion (e.g., vertical). In a typical implementation of such an embodiment, the second scanning mirror 728 is operated to provide the vertical scanning motion at a relatively slow scan rate, while the first scanning mirror 724 is operated to provide horizontal motion at a relatively fast scan rate. This results in the output beam 729 generating a scanning pattern 730.

To provide such a system, the rotation of the second scanning mirror 728 can be operated quasi-statically to create a vertical sawtooth raster trajectory. Conversely, the rotation of the first scanning mirror 724 can be operated on a resonant vibrational mode of the scanning mirror 724 to create sinusoidal motion. Together, this generates both horizontal and vertical motion of the laser beam and results in the pattern 730 of scan lines.

In these embodiments, output beam 729 sweeps back and forth left-to-right in a sinusoidal pattern, and sweeps vertically (top-to-bottom) in a sawtooth pattern with the display blanked during flyback (bottom-to-top). It should be noted that the illustrated scanning pattern 730 shows a sinusoidal pattern as the beam sweeps vertically top-to-bottom, but does not show the flyback from bottom-to-top.

In other embodiments, the vertical sweep is controlled with a triangular wave such that there is no flyback. In still further embodiments, the vertical sweep is sinusoidal. Finally, the various embodiments of the invention are not limited by the waveforms used to control the vertical and horizontal sweep or the resulting raster pattern 730.

It should be noted that in some embodiments, the first scanner assembly 722 and the second scanner assembly 726 both use electromagnetic actuation. However, in other embodiments one more of the scanner assemblies can use other techniques, including electrostatic or piezoelectric actuation. Furthermore, any number of mirrors and type of mirror actuation may be employed without departing from the scope of the present invention.

The drive circuits 720 provide drive signals to scanner assemblies 722 and 726. The drive signals include excitation signals to control the motion of the scanning mirrors 724 and 728. In operation, the laser light sources produce light pulses for each output pixel and scanning mirrors 724 and 728 reflect the light pulses as the output beam 729 traverses the pattern 730. Drive circuits 720 can also receive feedback signals from scanner assemblies 722 and 726. The feedback signals can describe the driven deflection angles of the mirrors, and can be used by the drive circuits 720 to more accurately control the motion of the scanning mirrors 724 and 728.

For example, the drive circuits 720 can excite resonant motion of scanning mirrors 724 and/or 728 such that the peak amplitude of the feedback signal is constant. This provides for a stable maximum angular deflection on the fast-scan axis as shown in raster pattern 730. The excitation signal used to excite resonant motion of scanning mirrors 724 and 728 can include both amplitude and a phase. Drive circuits 720 can include feedback circuits that modify the excitation signal amplitude to keep the feedback signal peak amplitude substantially constant. Additionally, the drive circuits 720 can modify the excitation signal to control the horizontal phase alignment and vertical position of the raster pattern 730.

To facilitate this, drive circuits 720 may be implemented in hardware, a programmable processor, or in any combination. For example, in some embodiments, drive circuit 720 is implemented in an application specific integrated circuit (ASIC). Further, in some embodiments, some of the faster data path control is performed in an ASIC and overall control is provided by a software programmable microprocessor.

It should be noted that while FIG. 5 illustrates an embodiment with red, green, blue, and infrared laser light sources, the various embodiments are not limited to these exemplary wavelengths of laser light.

In accordance with the embodiments described herein, the depth mapping device 740 is provided to generate the 3-dimensional point cloud of the surface. To facilitate this, the depth mapping device 740 includes multiple receiver channels to receive laser light reflected from a surface and generate signals proportional to the received laser light reflections. These receiver channels have different effective sensing ranges, and thus can provide the scanning laser projector with increased effective scanning range.

The depth mapping device 740 can also receive light timing data from the pixel drive generator 704 and/or infrared laser module 705. The depth mapping device can also receive mirror position data from the drive circuit 720. From those signals and data, the depth mapping device 740 generates the 3-dimensional point cloud of the surface. In one embodiment, depth mapping device 740 generates the 3-dimensional point cloud by calculating a time of flight for each pulse that is reflected back and received by the optical sensor. Specifically, the time of flight for each pulse to travel from the infrared laser module 705 to the surface, and back to the receiver channels can be determined at least in part by light timing data and the signals from the receiver channels. The location on the surface corresponding to each pulse can be determined at least in part from the mirror position data. Because the time of flight of each pulse is proportional to the distance to the surface at that point, the time of flight can be used to calculate the surface depth at that point of reflection. And when a composite of the determined surface depths from each point in the raster pattern scan is made, the resulting content can provide a 3-dimensional point cloud describing the surface depth of the scanned surface.

In one embodiment, a laser scanning device is provided, comprising: at least one source of laser light configured to generate a laser beam; at least one scanning mirror configured to reflect the laser beam; a drive circuit configured to provide an excitation signal to excite motion of the at least one scanning mirror to reflect the laser beam in a pattern of scan lines on a surface; a first receiver channel, the first receiver channel configured to receive first reflections of the laser beam from the surface and generate first timing data from the received first reflections, the first receiver channel configured to have a first effective sensing range; a second receiver channel, the second receiver channel configured to receive second reflections of the laser beam from the surface and generate second timing data from the received second reflections, the second receiver channel configured to have a second effective sensing range different from the first effective sensing range; and a point cloud calculator, the point cloud calculator configured to receive the first timing data and the second timing data and generate a 3-dimensional point cloud of the surface based at least in part on the first timing data and the second timing data.

In another embodiment, a laser scanning device is provided, comprising: at least one source of laser light configured to generate a laser beam that includes a plurality of pulses; at least one scanning mirror configured to reflect the laser beam; a drive circuit configured to provide an excitation signal to excite motion of the at least one scanning mirror to reflect the laser beam in a pattern of scan lines on a surface; a first receiver channel, the first receiver channel configured to receive first reflections of the laser beam from the surface and generate first timing data from the received first reflections, the first receiver channel including a first photodiode having a first responsivity to provide in part a first effective sensing range; a second receiver channel, the second receiver channel configured to receive second reflections of the laser beam from the surface and generate second timing data from the received second reflections, the second receiver channel including a second photodiode having a second responsivity to provide in part a second effective sensing range, wherein the first responsivity is greater than the second responsivity such that the first effective sensing range extends farther than the second effective sensing range, and wherein the first effective sensing range has a partially overlapping region with the second effective sensing range; and a point cloud calculator, the point cloud calculator configured to receive the first timing data and the second timing data, the point cloud calculator configured to generate a 3-dimensional point cloud of the surface based on the first timing data when the surface is in the first effective sensing range, generate the 3-dimensional point cloud of the surface based on the second timing data when the surface is in the second effective sensing range, and to generate the 3-dimensional point cloud of the surface based on both the first timing data and the second timing data when the surface is in the partially overlapping region.

In another embodiment, method of generating a 3-dimensional point cloud of a surface is provided, comprising: generating a laser beam; reflecting the laser beam with at least one scanning mirror; exciting motion of the at least one scanning mirror to reflect the laser beam in a pattern of scan lines on the surface; receiving first reflections of the laser beam from the surface at a first receiver channel and generating first timing data from the received first reflections, the first receiver channel configured to have a first effective sensing range; receiving second reflections of the laser beam from the surface at a second receiver channel and generating second timing data from the received second reflections, the second receiver channel configured to have a second effective sensing range different from the first effective sensing range; and generating a 3-dimensional point cloud of the surface based at least in part on the first timing data and the second timing data.

In the preceding detailed description, reference was made to the accompanying drawings that show, by way of illustration, specific embodiments in which the invention may be practiced. These embodiments were described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The preceding detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A method of generating a 3-dimensional point cloud of a surface, the method comprising:
   generating a laser beam;
   reflecting the laser beam with at least one scanning mirror;
   exciting motion of the at least one scanning mirror to reflect the laser beam in a pattern of scan lines on the surface;
   receiving first reflections of the laser beam from the surface at a first receiver channel and generating first timing data from the received first reflections, the first receiver channel configured to have a first effective sensing range;
   receiving second reflections of the laser beam from the surface at a second receiver channel and generating second timing data from the received second reflections, the second receiver channel configured to have a second effective sensing range different from the first effective sensing range; and
   generating a 3-dimensional point cloud of the surface based at least in part on the first timing data and the second timing data;
   wherein the first effective sensing range has a partially overlapping region with the second effective sensing range, and wherein the generating the 3-dimensional point cloud of the surface based at least in part on the first timing data and the second timing data point comprises generating the 3-dimensional point cloud of the surface based on both the first timing data and the second timing data when the surface is in the partially overlapping region, and wherein the generating the 3-dimensional point cloud of the surface based on both the first timing data and the second timing data when the surface is in the partially overlapping region comprises using a weighted average of the first timing data and the second timing data.

2. The method of claim 1, wherein the first receiver channel includes a first optical sensor, and wherein the second receiver channel includes a second optical sensor, and wherein the first optical sensor has a first responsivity and the second optical sensor has a second responsivity, and wherein the first responsivity is greater than the second responsivity.

3. The method of claim 1, wherein the generating the 3-dimensional point cloud of the surface based at least in part on the first timing data and the second timing data point comprises generating the 3-dimensional point cloud of the surface based on the first timing data when the surface is in the first effective sensing range and generating the 3-dimensional point cloud of the surface based on the second timing data when the surface is in the second effective sensing range.

4. The method of claim 1, wherein the first effective sensing range has a partially overlapping region with the second effective sensing range, and wherein the generating the 3-dimensional point cloud of the surface based at least in part on the first timing data and the second timing data point comprises generating the 3-dimensional point cloud of the surface by calculating a time of flight for a return of the received reflections of the laser beam.

5. A laser scanning device comprising:
at least one source of laser light configured to generate a laser beam;
at least one scanning mirror configured to reflect the laser beam;
a drive circuit configured to provide an excitation signal to excite motion of the at least one scanning mirror to reflect the laser beam in a pattern of scan lines on a surface;
a first receiver channel, the first receiver channel configured to receive first reflections of the laser beam from the surface and generate first timing data from the received first reflections, the first receiver channel configured to have a first effective sensing range;
a second receiver channel, the second receiver channel configured to receive second reflections of the laser beam from the surface and generate second timing data from the received second reflections, the second receiver channel configured to have a second effective sensing range different from the first effective sensing range; and
a point cloud calculator, the point cloud calculator configured to receive the first timing data and the second timing data and generate a 3-dimensional point cloud of the surface based at least in part on the first timing data and the second timing data;
wherein the first effective sensing range has a partially overlapping region with the second effective sensing range, and wherein the point cloud calculator is configured to generate the 3-dimensional point cloud of the surface based on both the first timing data and the second timing data when the surface is in the partially overlapping region, and wherein the point cloud calculator is configured to generate the 3-dimensional point cloud of the surface based on both the first timing data and the second timing data by selecting from the first timing data and the second timing data based on signal amplitude levels in the first receiver channel and the second receiver channel.

6. The laser scanning device of claim 5, wherein the first receiver channel includes a first optical sensor, and wherein the second receiver channel includes a second optical sensor, and wherein the first optical sensor has a first responsivity and the second optical sensor has a second responsivity, and wherein the first responsivity is greater than the second responsivity.

7. The laser scanning device of claim 6, wherein the first optical sensor comprises an avalanche photodiode (APD) and wherein the second optical sensor comprises a photodiode.

8. The laser scanning device of claim 6, wherein the first optical sensor comprises silicon photo multiplier (SiPM) and wherein the second optical sensor comprises a photodiode.

9. The laser scanning device of claim 5, wherein the first receiver channel includes a first amplifier, and wherein the second receiver channel includes a second amplifier, and wherein the first amplifier has a first gain, and wherein the second amplifier has a second gain, and wherein the first gain is greater than the second gain.

10. The laser scanning device of claim 5, wherein the first effective sensing range includes distances between 0.1 to 1.5 meters and wherein the second effective sensing range includes distances from 1.0 to 20.0 meters.

11. The laser scanning device of claim 5, wherein the at least one source of laser light is configured to generate pulses in the laser beam, and wherein the point cloud calculator generates the 3-dimensional point cloud of the surface by calculating a time of flight for a return of the pulses in the laser beam.

* * * * *